United States Patent [19]
Gött et al.

[11] 3,823,835
[45] July 16, 1974

[54] APPARATUS FOR TURNING OVER AND STACKING MESH MATS

[75] Inventors: Hans Gött; Josef Ritter; Klaus Ritter; Gerhard Ritter, all of Graz, Austria

[73] Assignee: Firma EVG Entwicklungs- u. Verwertungsgesellschaft m.b.H., Graz, Austria

[22] Filed: Aug. 1, 1973

[21] Appl. No.: 384,741

[30] Foreign Application Priority Data
Aug. 18, 1972 Austria.............................. 7168/72

[52] U.S. Cl................ 214/6 DK, 214/1 G, 214/6 G
[51] Int. Cl........................................... B65g 67/06
[58] Field of Search.................. 214/6 DK, 6 G, 1 Q

[56] References Cited
UNITED STATES PATENTS
2,342,014  2/1944  Schanstra............................ 214/1 Q
3,469,714  9/1969  Paquette.......................... 214/6 DK Primary Examiner—Robert G. Sheridan
Attorney, Agent, or Firm—Ernest F. Marmorek

[57] ABSTRACT

The invention is concerned with an apparatus for stacking mesh mats leaving a mash production machine and for turning at least some of the mats about their longitudinal axis immediately above the stack. The apparatus comprises at least one gantry which bridges the mesh feed path and which forms an arcuate track for a carriage, an arm which is rigidly connected to the carriage and has two opposite supporting surfaces for mesh mats which, when the carriage is on one of the upright side portions of its track extends across the gantry opening, and releasable guide and holding devices provided on each supporting surface of the arm to guide a mesh mat while it is being fed onto the arm and to hold it temporarily until it is stacked with or without a turning operation.

12 Claims, 9 Drawing Figures

APPARATUS FOR TURNING OVER AND STACKING MESH MATS

The mesh mats leaving continuous-working mesh production machines, for example steel mesh welding machines, are generally cut to the required length to form mesh mats by shears. For the compact stacking of such mesh mats it is desirable to turn alternate mats over through 180° because in this manner the transverse wires or the longitudinal wires of two mats stacked immediately above one other come to lie in the same plane, as a result of which the height of the stack is reduced to half that value which would be necessary if mesh mats were stacked orientated in the same direction.

The known devices for turning over and stacking mesh mats, which are briefly termed "mat turners," are installed after a mesh production machine and mat shears, and render possible a compact stacking of mesh mats either to the side of the feed path of the mesh mats or in the feed direction of the mesh mats, behind the mat turner. Thus in both cases, additional space situated outside the plan of the mat turner is necessary for the stacking operation. This considerably increases the space requirements for the whole mesh production installation or in many cases prevents the accommodation of a mat turner.

A further disadvantage of the mat turners hitherto known is that the turned and unturned mats are deposited on a base or on the stack of mats in free fall, automatically by the mat turners or by hand, and as a result of the relatively great height of fall there is an extremely disturbing noise, furthermore, it is difficult to obtain satisfactory stacks of mats because the very resilient mesh mats are displaced out of the prescribed desired position as they fall down, rebounding resiliently.

In accordance with the invention, apparatus for stacking mesh mats leaving a mesh production machine and for turning at least some of the mats about their longitudinal axis immediately above the stack comprises at least one gantry which bridges the mesh feed path and which forms an arcuate track for a carriage, an arm which is rigidly connected to the carriage and has two opposite supporting surfaces for mesh mats and which, when the carriage is on one of the upright side portions of its track, extends across the gantry opening, and releasable guide and holding devices provided on each supporting surface of the arm to guide a mesh mat while it is being fed onto the arm and to hold it temporarily until it is stacked with or without a turning operation.

This construction overcomes the main disadvantage described in the known mat turners, and renders possible turning of the mats about their longitudinal axis and depositing of the mats in the region of the floor plan of the turning operation.

The highest point of the track formed by the gantry is situated higher than the mesh production plane, preferably substantially by the length of the arm, in order that the gantry may be free for the feed of the next mesh mat as quickly as possible on each turning operation.

The track for the carriage preferably extends to below the mesh production plane so that the arm can be lowered into the immediate vicinity of the current surface of the stack of mats and the mesh mats released by the holding devices can therefore be deposited on the stack of mats with the minimum possible height of fall, that is to say without any disturbing noise.

The arm is preferably a supporting frame which is formed from a longitudinal member and transverse members and which carries mesh guide rails extending in the longitudinal direction and holders for mesh mats disposed spaced apart on both flat sides. The mutual spacing of the holders for the mesh mats is preferably adjustable for adaptation to the width of the particular mesh mats to be produced.

The holders can actually be of any construction, for example in the form of controlled electromagnets. In a specific example, however, the holders are formed by supporting strips pivotally mounted on the supporting frame. The opening and closing movement of the holders is controlled automatically depending on the movement of the carriage and supporting frame so that the holders are opened whenever the supporting frame is near the surface of the stack of mats. A control cam which can be actuated by the movement of the carriage or of the supporting frame along the gantry may be provided for this purpose.

An example of apparatus constructed in accordance with the invention is illustrated in the accompanying drawings, in which.

Figure 8:
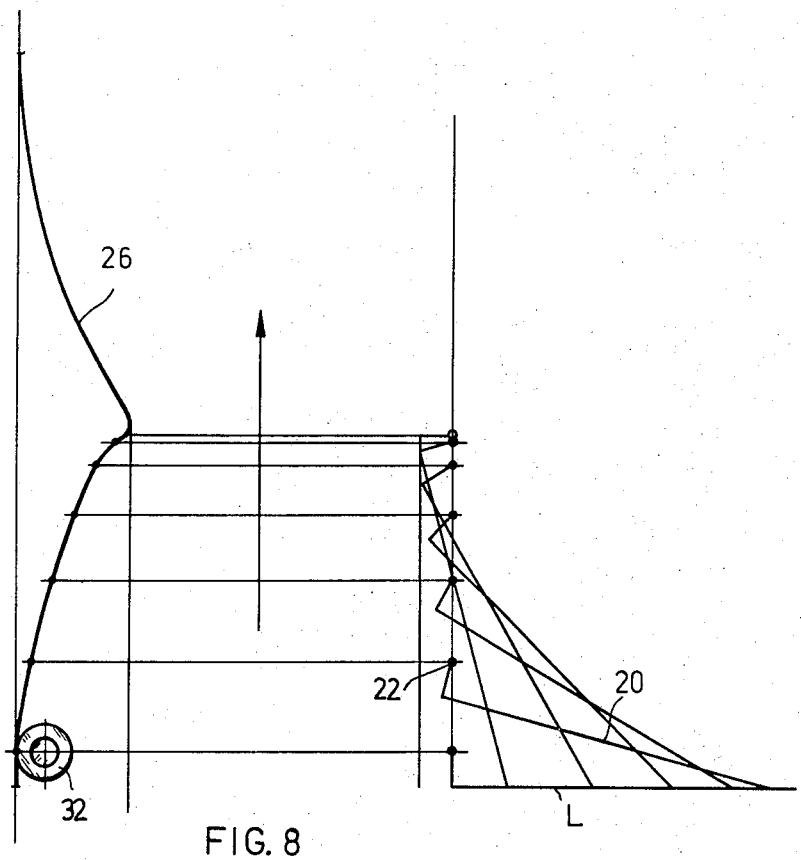
Figure 9:
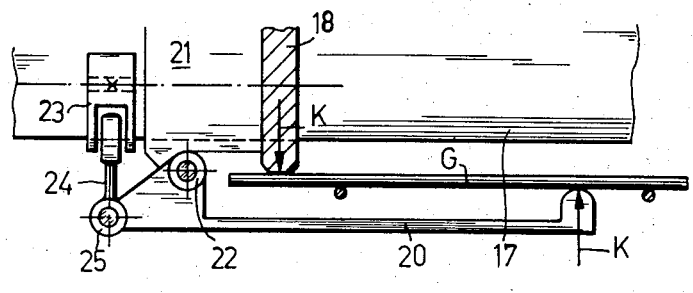

FIG. 8 explains diagrammatically the course of the control cam and the movement of the holder produced by this; and, FIG. 9 finally shows the marginal gripping of a mesh mat between the holder and a guide rail on the supporting frame.

Figure 1:
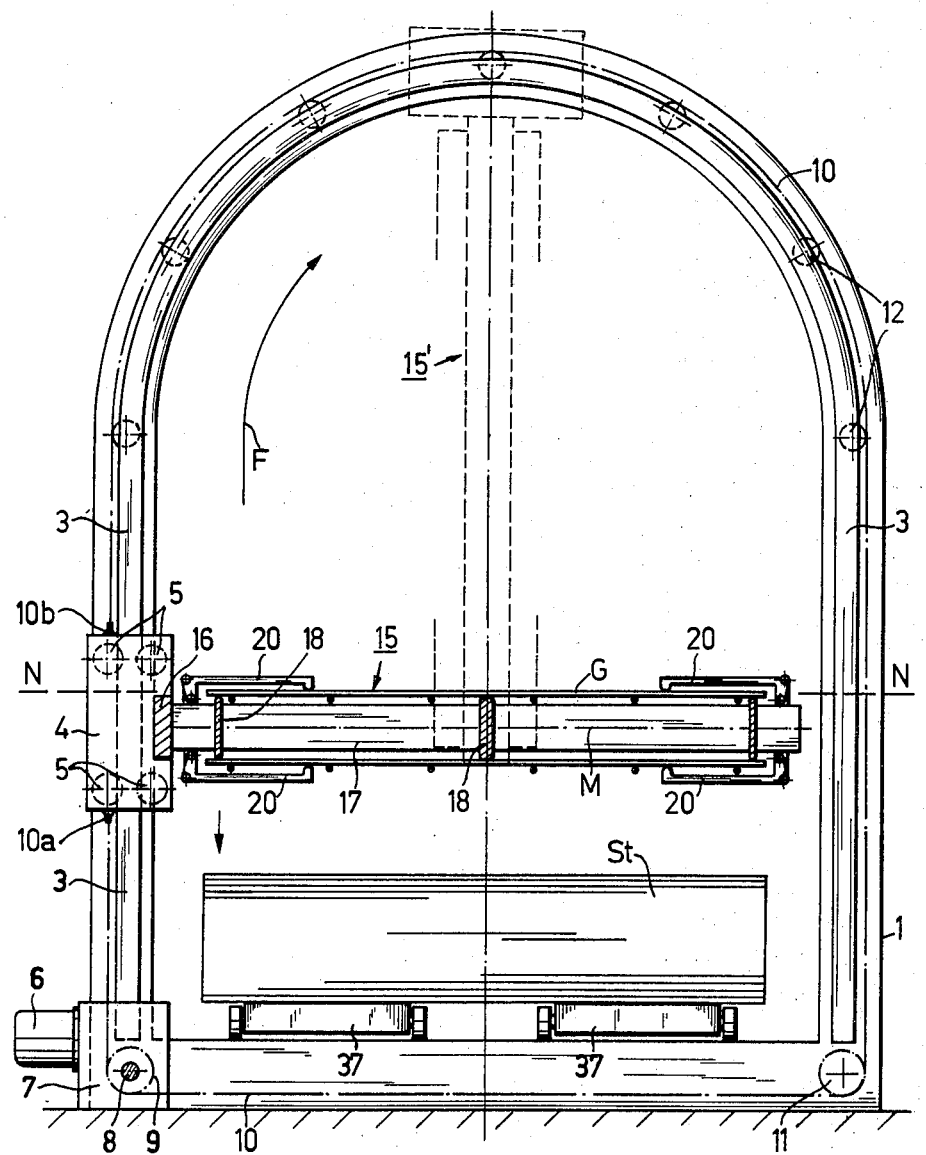
FIG. 1 is an elevation of the apparatus.
Figure 2:
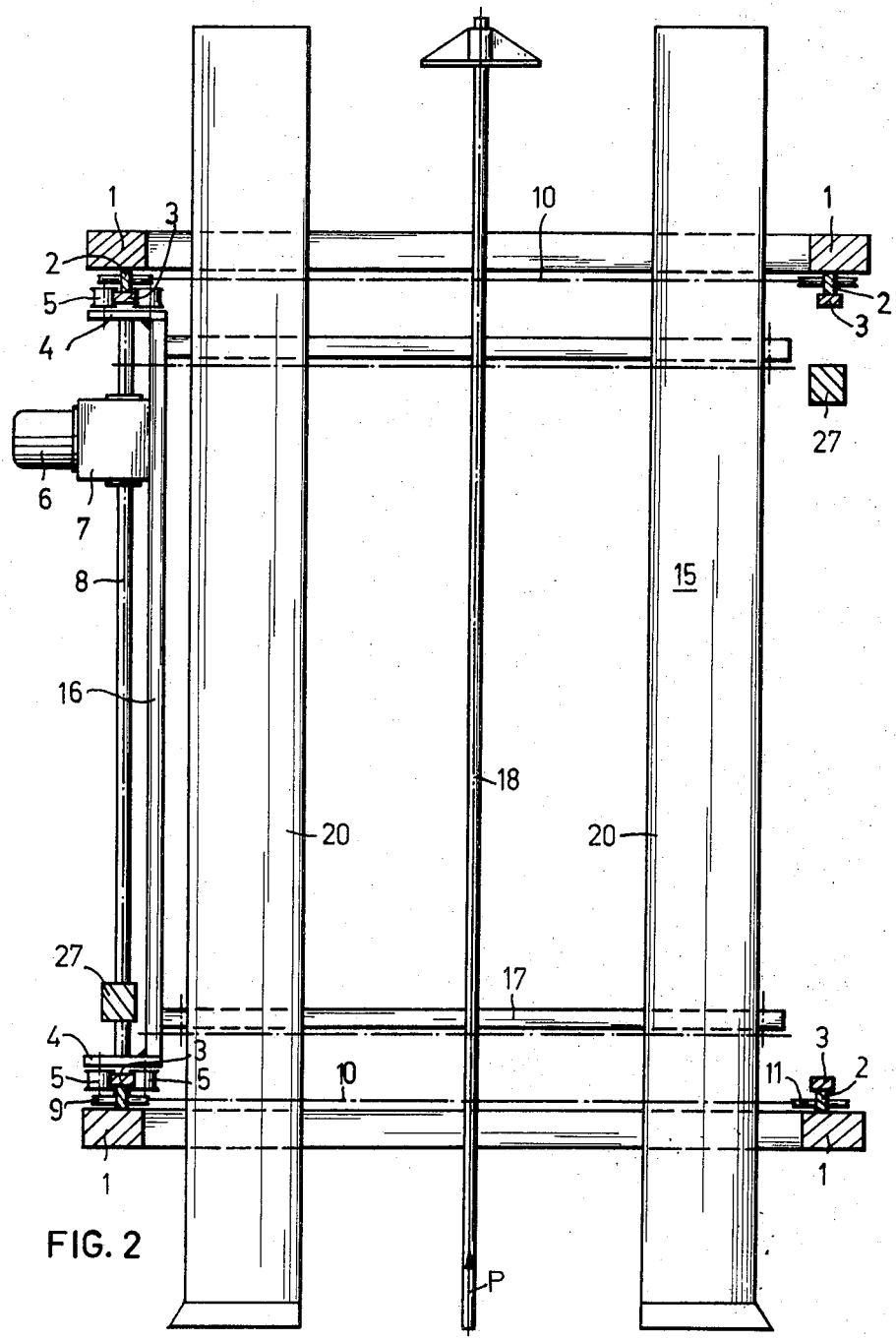
FIG. 2 is a plan.

FIGS. 1 and 2 show two spaced gantry frames 1 which are in alignment with one another and symmetrically bridge the extended discharge path of the mesh emerging from a mesh production machine and the centre line of which is indicated by an arrow P in FIG. 2. The gantry frames 1 can be displaceable sideways in the direction of their planes by means of suitable devices not illustrated, so that they can always be disposed symmetrically with respect to the extended mesh discharge path even when only a portion, which is offset laterally, of the width of the mesh production machine is being used for the mesh production.

Runway rails 3 are secured, by means of distance pieces 2, to the sides of the gantry frames 1 facing one another, following the arcuate course of this frame. A carriage 4 can travel on the runway formed by the runway rail 3 of each gantry frame 1, from the one side of the gantry frame to the other side to below the mesh production plane, by means of guide rollers 5, as indicated in FIG. 1 by an arrow F. The mesh production plane should be regarded as being at the height of the horizontal line N in FIG. 1.

Rigidly connected to the two carriages 4 is a supporting frame which is designated as a whole by 15 and which, cantilevering freely from the carriage 4, projects into the opening of the gantry frame 1 and the length of which is shorter than the width of the gantry so that the carriage 4 with the supporting frame 15 can travel without hindrance over the arcuate path determined by the runway rails 3.

A motor 6 serves to drive the two carriages 4, preferably an electric motor with a reversible direction of rotation which, through a worm gear or toothed-wheel gear 7, sets a shaft 8 in rotation which extends on one side of the gantry frames 1, close to the bases thereof. Mounted on each end of the shaft 8 is a drive wheel 9 which is connected to this shaft for rotation therewith and which transmits the rotary movement of the shaft 8 to a conveyor chain 10. Each conveyor chain 10 is secured at one end 10a to an associated carriage 4, runs over a drive wheel 9, a guide wheel 11 at the base of the opposite side of the gantry frame 1, over idlers 12, which are mounted on the gantry frame, and is secured at its other end 10b, to the carriage 4. The guide wheel 11 can fulfil the function of a chain tension adjuster at the same time.

Figure 3:
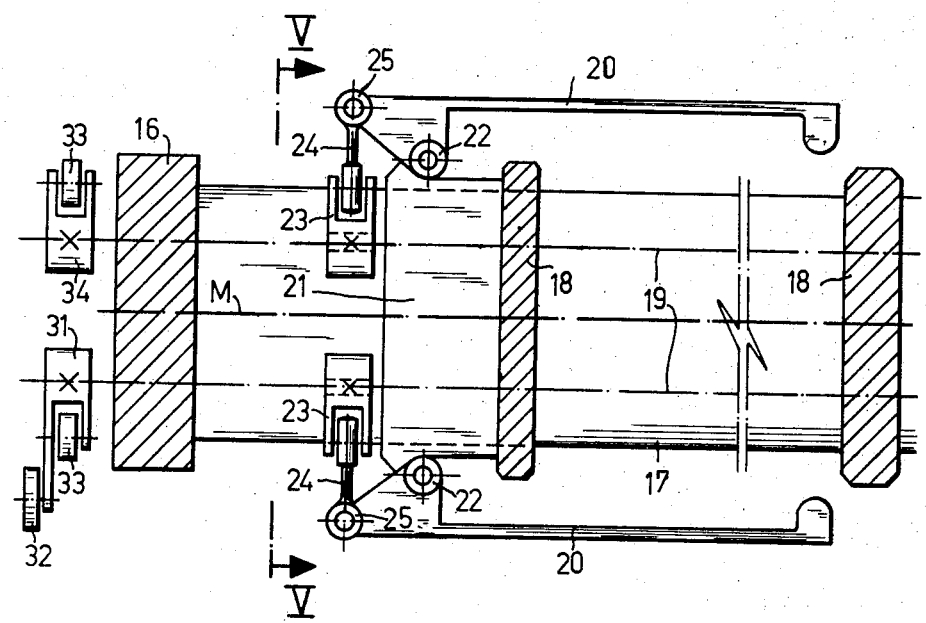
FIG. 3 shows half a transverse member of a supporting frame with the holders for the mesh mats and the actuating devices for these holders in the closed position.
Figure 4:
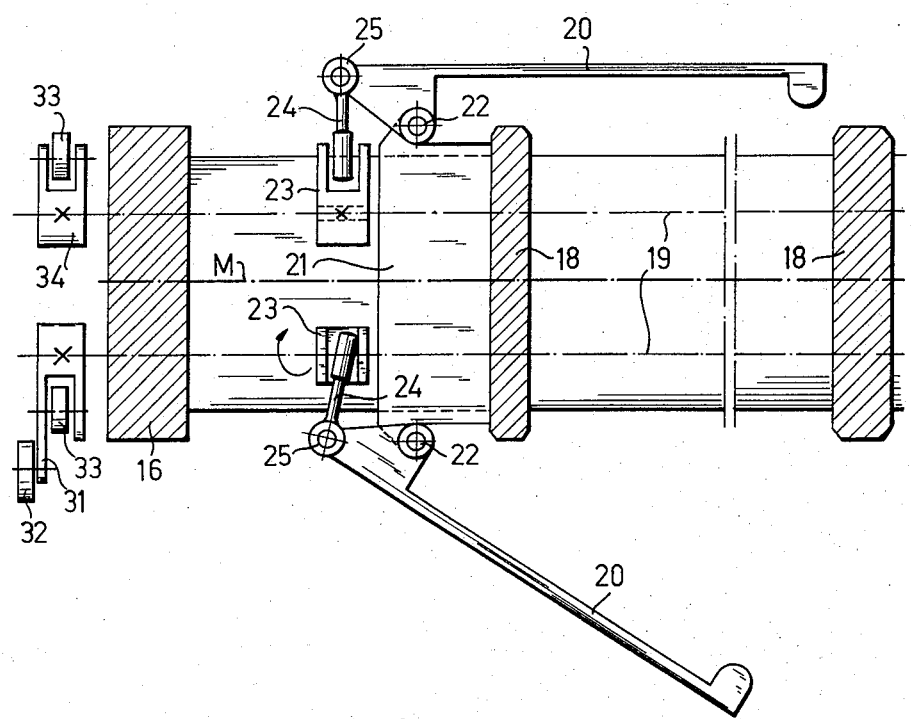
FIG. 4 is a similar illustration to FIG. 3 but shows the lower holders in the open position.

As shown in FIGS. 3 and 4, the supporting frame 15 consists of a longitudinal member 16, at each end of which there is disposed a transverse member 17, the transverse members 17 also being connected to one another by one or more mesh guide rails 18 which form supporting surfaces for mesh mats and facilitate the introduction of the mesh mats into holders 20 on the supporting frame.

The holders 20 are disposed at both sides of the centre plane M of the supporting frame 15 and are each in the form of two supporting strips which are pivotally mounted at their outer edges and which, in the working position illustrated in FIGS. 1 and 3, hold the mesh mats G, which have been pushed onto the mesh guide rails 18 of the supporting frame 15, on these rails or on the supporting frame. Two control shafts 19, which serve to actuate the holders 20, extend along each of the transverse members 17 of the supporting frame 15.

Figure 5:
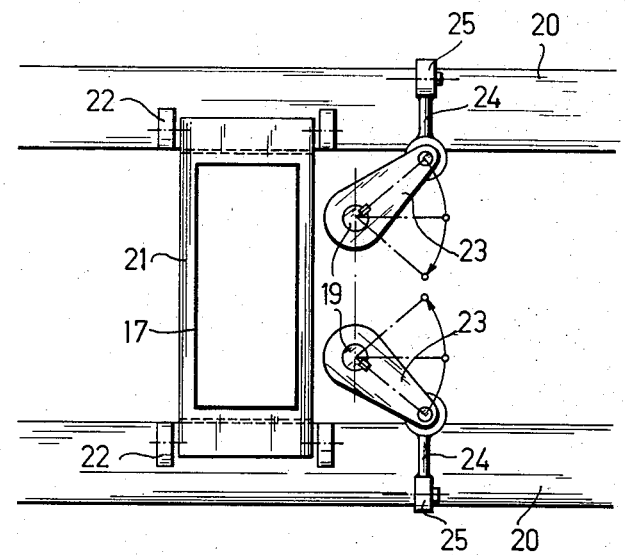
FIG. 5 is a section taken on the line V—V in FIG. 3.

As can be seen in particular from FIG. 5, the transverse members 17 are preferably constructed in the form of rectangular box girders. Two guides 21, which are likewise constructed in the form of box sections, for the holders 20 surround the associated transverse member and are displaceable along this and can be located in a selective position by means not shown. By this measure, the spacing of the holders 20 on the supporting frame 15 can be adapted to the width of the mesh mats being produced at any time. Associated guides 21 on the adjacent transverse members 17 are each rigidly connected to one another by one of the mesh guide rails 18.

The holders 20 for the mesh mats are connected to the guides 21 by hinges 22. Cranks 23, which are displaceable along the control shafts 19 but fixed to these control shafts for rotation therewith, together with push rods 24, which are pivoted to the holders 20 at 25, enable a rotary movement of the control shafts 19 to be converted into an opening or closing movement of the holders 20. In FIG. 3, the upper and lower holders 20 are shown in the closed position, whereas in FIG. 4 the lower holders are in the open position in which they form inclined planes, down which the previously restrained mesh mats can slide.

Figure 7:
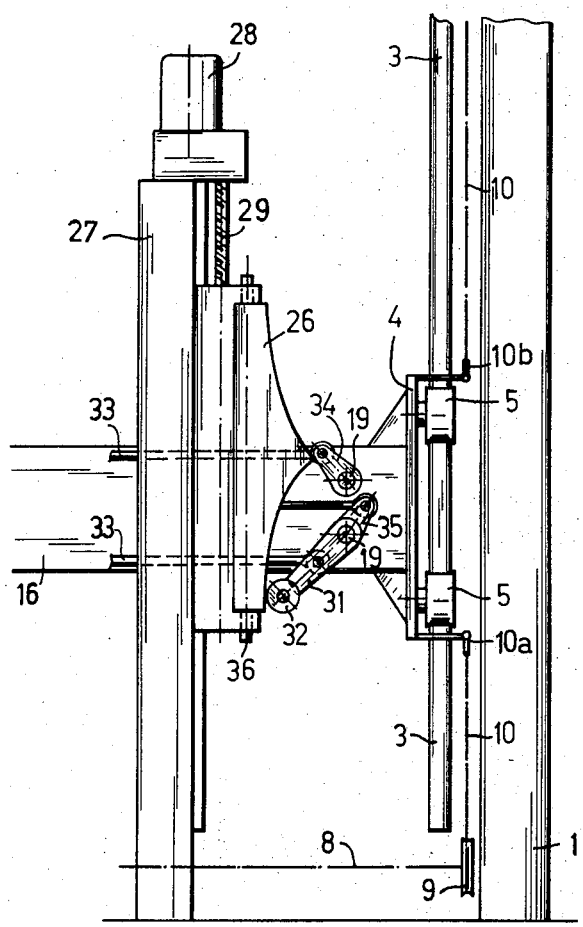
FIG. 7 shows the cam gear for this actuating device.

As shown in FIG. 7, the opening and closing of the holders 20 is effected automatically by means of control cams 26. A control-cam carrier 27, along which the control cam 26 is adjustable in height by means of a servo-motor 28 and a threaded spindle 29 driven by this servo-motor, is associated with each gantry frame 1. The two control-cam carriers 27 of the two associated gantry frames 1 are preferably disposed at opposite sides of these gantry frames.

Figure 6:
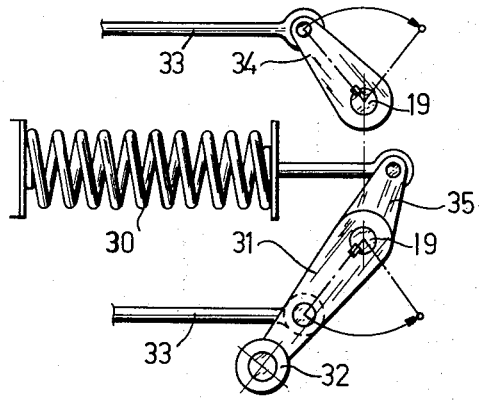
FIG. 6 is a further detail of the actuating device for the holder on the supporting frame.

As shown in FIG. 6, one of each of the two control shafts 19 extending parallel to a transverse member 17 carries at one end an actuating lever 31, which is provided with a follower roller 32 that rolls along the control cam 26. The actuating lever 31 is fixed to the associated control shaft 19 for rotation therewith.

In addition, a push rod 33 connects the actuating lever 31 to the corresponding control shaft 19 of the second transverse member 17 of the gantry frame. This connection is effected by means of an actuating lever 34, which is fixed to the control shaft of the other transverse member for rotation therewith and on which the push rod 33 is articulated. The cooperating control shafts 19, thus connected, of the two transverse members 17, actuate the holders 20, disposed at one side of the centre plane of the supporting frame 15, by means of the push rods 24 acting on these holders. The actuation of the holders 20 disposed at the other side of the centre plane of the gantry frame in each case is effected in a similar manner, but by the control cam 26 disposed at the opposite side of the gantry frame 1.

A helical spring 30, which acts on a lever 35 fixed to the control shaft 19 for rotation therewith, tends both to close the holders 20 and to urge the follower roller 32 against the control cam 26.

In FIG. 8, the movement of the holders 20 depending on the position of the follower roller 32 along the control cam 26 is illustrated. As can be seen, during the opening, the holder 20 moves so that its free end is displaced along a straight, horizontal line L, while at the same time the hinge 22 provided on the guide 21 moves upwards with the supporting frame 15. The opposite holder 20, which is disposed at the same side of the centre plane M of the supporting frame 15, executes a movement which is a mirror image of this.

Thus, if the supporting frame 15, after it has been lowered to within a few cm of the current surface of the stack of mats, begins to move upwards again, then the two holders 20 holding the mesh mat open simultaneously with a symmetrical pivotal movement, which is directed downwards away from the centre axis of the mesh mat, as a result of which the mesh mat is deposited gently and without any distrubing noise on the stack, with continuous lateral guiding by the holders 20.

As FIG. 9 shows, the arrangement is such that the particular mat being carried by the lower holders is gripped marginally as it were by a pair of oppositely directed forces K, such that the mat is supported from above at the outermost edge at a mesh guide rail 18 and from below somewhat further in by a marginal bead on the holder 20. As a result, even relatively wide mats can be held satisfactorily by relatively narrow holders.

It may also be mentioned that the control cams 26 are mounted for pivoting about a pin 36 and are held in their working position by a spring not illustrated and a stop. The upper portion of each control cam is so shaped that when the follower roller 32, coming from above with a downward direction of motion, runs onto the control cam, the control cam is deflected out of the path of the follower roller by pivoting about the pin 36. Thus, with this direction of movement, the control cam cannot actuate the follower roller and so cannot cause any opening movement of the holders 20.

With the reverse direction of movement of the follower roller 32, that is to say from the bottom upwards, however, the control cam 26 remains in the path of movement of the follower roller, that is to say it does not pivot about the pin 30, and so actuates the follower roller in the sense of opening the holders 20.

It would naturally also be possible to mount the control cam directly on one of the arms of the gantry frame 1, in which case it would be possible to dispense with its own control-cam carrier 27.

The mode of operation of the turning and stacking device according to the invention is as follows:

At first, the supporting frame is in an initial position in which the holders 20, disposed at what is at present the under side of the supporting frame, are in vertical alignment with the mesh production plane N so that mesh mats can be pushed into the lower holders 20. In the course of this, these holders are closed. As is usual, the mesh mat is not conveyed directly out of the mesh production machine into the turning and stacking device, but an individual charging device is provided — which is not a subject of the invention and therefore need not be described further. This device first receives the mats leaving the mesh production machine and cut to length by mat shears, and then conveys them at a suitable moment into the turning and stacking device.

As soon as the first mesh mat has been pushed into the holders 20 at the under side of the supporting frame 15, the supporting frame moves downwards to such an extent that what is at present the top of the supporting frame lies in the mesh production plane N and can be loaded with a mesh mat.

The supporting frame now carries a mesh mat in each of the holders 20 at both sides of its centre plane M and slides down on the gantry frame until a sensing device, not illustrated, touches what is at present the surface of the stack of mats St. As a result of this contact, the direction of rotation of the motor 6 and hence the direction of movement of the supporting frame 15 along the gantry frame is reversed.

During the upward movement of the supporting frame 15, which now begins, the follower roller 32, which controls the holders 20 at present at the under side of the supporting frame, runs onto its associated control cam 26 and opens these holders in the manner already described, the mesh mat being deposited gently on the stack of mats. In the course of this, the helical spring 30 is tensioned.

The supporting frame continues its upward movement without interruption and, after the follower roller 32 has passed the apex of the control cam 26, the helical spring 30 relaxes again and closes the holders 20.

The gantry planes are dimensioned so that the highest point of the runway formed by this frame is higher than the mesh production plane N substantially by the length of the supporting frame 15, as is indicated by the broken lines 15' in FIG. 1.

After passing the apex of the gantry frame 1, the supporting frame 15 slides downwards on the other arm thereof and now carries a mat turned through 180°.

The follower roller 32, which is associated with those holders 20 which carry this turned mesh mat still held on the supporting frame 15, deflects, during the downward movement, the control cam 26 which is mounted on the other side of the gantry, and this control cam executes a pivotal movement about the pin 36.

As soon as a second sensing device touches the surface of the stack of mats, the supporting frame again reverses its direction of movement, while the second, turned mat is now also gently deposited on the stack of mats St in the manner already described.

The supporting frame now continues its upward movement only until the lower holders, which carried the mat just deposited, are closed again. Then the supporting frame slides downwards again, to such an extent that its holders which are not situated underneath can receive the next mesh mat.

The same cycle of movements now begins but with an initial position reversed in comparison with the cycle of movements just ended.

Since the opening of the holders 20 for the purpose of depositing the mesh mats on the stack should begin immediately after the start of the upward movement of the supporting frame, the height of the control cam 26 must be adapted to the height of the stack of mats at the time. This is effected by means of the servo-motor 28 and the threaded spindle 29. The actuation of the servo-motor, which drives the threaded spindle 29, is preferably effected by the sensing device which senses the height of the stack of mats and initiates the reversal of movement of the supporting frame. The adjustment of the control cam 26 can be carried out in the most varied ways, for example, every time the sensing device measures the height of the stack of mats, a readjustment may be effected by the differential amount in comparison with the previous measurement. On the other hand, the readjustment could also be effected in stages, for example in such a manner that when there is a drop below a certain minimum distance between the bottom edge of the control cam and the surface of the stack of mats, a readjustment is effected by a certain, predetermined amount.

Such readjustment devices are as well known as circuit elements which are capable of initiating or terminating the individual movement steps of the supporting frame and, since they do not form the subject of the invention, do not need to be described in more detail here. A roller conveyor 37 may also be provided for the easy removal of the stack of mats. It is naturally also possible to impart that relative movement which ensures gentle depositing of the mat to the mat to be deposited in each case instead of to the stack of mats. For example, after the depositing of each mat, the stack of mats may be lowered so that its surfaces retains a constant level.

We claim:

1. Apparatus for stacking mesh mats leaving a mesh production machine and for turning at least some of said mats about their longitudinal axis immediately above the stack, said apparatus comprising at least one gantry which bridges the mesh feed path and forms an arcuate track, a carriage which runs on said track, an arm rigidly connected to said carriage and presenting two opposite supporting surfaces for mesh mats, said arm being adapted, when said carriage is on one of the upright side portions of said track, to extend across said gantry, and releasable guide and holding devices provided on each supporting surface of said arm to guide a mesh mat while it is being fed onto said arm and to hold it temporarily until it is stacked with or without a turning operation.

2. Apparatus according to claim 1, wherein the high point of said track formed by said gantry is higher than the feed plane of mesh produced by said mesh production machine substantially by the length of said arm.

3. Apparatus according to claim 1, wherein said track of said carriage extends to below the feed plane of mesh from said mesh production machine whereby said arm can be lowered to within the immediate vicinity of the surface of the stack of mats.

4. Apparatus according to claim 1, further comprising a chain fixed to said carriage and extending in a closed loop around said gantry, a motor operatively connected to said chain to drive said chain and convey said carriage along said track.

5. Apparatus according to claim 1, wherein said arm is a supporting frame formed from a longitudinal member and transverse members and carrying a mesh guide rail extending in the longitudinal direction and holders spaced apart on both sides.

6. Apparatus according to claim 5, further comprising means for adjusting the mutual spacing of said holders on each side.

7. Apparatus according to claim 6, wherein said holders are mounted on guides displaceable on said transverse members of said supporting frame.

8. Apparatus according to claim 5, wherein said holders are formed by supporting strips and there are means pivotally mounting said supporting strips on said supporting frame.

9. Apparatus according to claim 5, further comprising means responsive to movement of said carriage and supporting frame automatically to control the opening and closing movement of said holders.

10. Apparatus according to claim 9, wherein said last named means comprises a control cam, and a complementary follower carried by said carriage and supporting frame.

11. Apparatus according to claim 10, further comprising means for adjusting the effective height of the control cam.

12. Apparatus according to claim 1, wherein said gantry is displaceable laterally with respect to said mesh feed path from said production machine.

* * * * *